(No Model.)

J. W. LUTHE & A. E. JEAVONS.
ELECTRICAL ANNUNCIATOR.

No. 443,834. Patented Dec. 30, 1890.

Witnesses:
Belle S. Lowrie
Will B. Sage

Inventors:
John W. Luthe
Alfred E. Jeavons
Leggett and Leggett
Attorneys

UNITED STATES PATENT OFFICE.

JOHN W. LUTHE AND ALFRED E. JEAVONS, OF CLEVELAND, OHIO; SAID JEAVONS ASSIGNOR OF ONE-HALF TO SAID LUTHE.

ELECTRICAL ANNUNCIATOR.

SPECIFICATION forming part of Letters Patent No. 443,834, dated December 30, 1890.

Application filed January 23, 1890. Serial No. 337,797. (No model.)

*To all whom it may concern:*

Be it known that we, JOHN W. LUTHE and ALFRED E. JEAVONS, of Cleveland, in the county of Cuyahoga and State of Ohio, have invented certain new and useful Improvements in Electrical Annunciators; and we do hereby declare the following to be a full, clear, and exact description of the invention, such as will enable others skilled in the art to which it pertains to make and use the same.

Our invention relates to improvements in electrical annunciators; and it consists in certain features of construction and in combination of parts hereinafter described, and pointed out in the claims.

Figure 1:
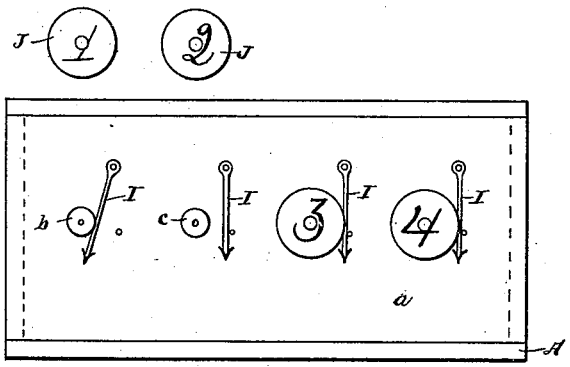
Figure 2:
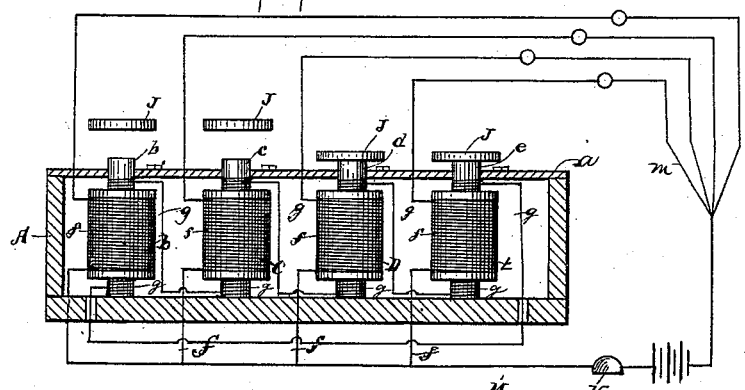
Figure 3:
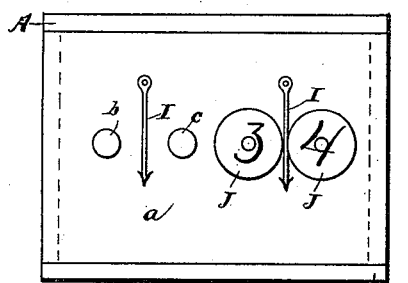

In the accompanying drawings, Figure 1 is a front side elevation. Fig. 2 is a bottom plan with the lower wall of the casing removed. Fig. 3 is a front side elevation showing a modification.

A represents the casing of the annunciator, and $a$ the face-plate thereof.

B, C, D, and E are differential magnets of a series, any number of which may be employed, and $b$, $c$, $d$, and $e$ are the respective cores thereof, these cores being fastened to the back wall of the casing and the forward ends of the cores extending through holes in the face-plate and projecting perhaps a quarter of an inch (more or less) in front of the face-plate. The extreme forward ends of the respective cores are provided with detachable caps or disks J, these caps or disks being numbered to correspond with the numbers of the rooms or stations where the different call-buttons are located. The cores are first wound each with one or more layers of small wire $g$. Outside of wire $g$ the cores are wound with preferably larger wire $f$ in several layers after the usual manner of winding helices, wires $g$ and $f$ running spirally in opposite directions, the coils $f$ being the primary and the coils $g$ the secondary coils. The one end of wire $f$ of each primary coil leads to the corresponding call-button. The other end of the wire of each of the primary coils connects in common wire M, the latter leading to the battery, but including a call-bell K in the circuit. Beyond the battery wire M has branches $m$ $m$, these branch wires leading to the respective call-buttons of the different rooms or stations. The one end of each wire $g$—for instance, the wire of core No. 1 $b$, and, for instance, the front end of this wire—leads to the rear end of core No. 2 $c$ and connects with wire $g$ of this core, and so on throughout the series, the wires $g$ from the extreme cores of the series being also connected, whereby a continuous closed circuit is had throughout the secondary coils of the series of cores. The coils $g$ have much less magnetic force than the coils $f$, and the secondary coils $g$ have only an induced current, which is had from the different primary coils $f$ when one of the latter may be operative for the time being by reason of its circuit being closed by means of its call-button.

I I are gravity-pointers pivoted to the face-plate in the position shown, each pointer being preferably provided with stop $i$, and between the stop and the adjacent cores the pointer may vibrate.

In the use of the terms "primary" and "secondary" we would explain that they are not used in the general sense, but merely in the sense of devices having an inductive influence on each other.

In operating the device, suppose that by means of a call-button the circuit of the primary coil No. 1 is closed, in which case by reason of the primary current and magnetic force of core No. 1 it will attract and draw pointer No. 1 against this core, and thus indicate the room or station No. 1, whence this call originated. After the primary current has been broken the residual magnetism in the core is likely to hold the pointer for some time against the core; but suppose that while pointer No. 1 is thus being held against the opposing core another call connects the circuit of some other helix—for instance, helix No. 2—in which case pointer No. 2 will be actuated, and thereby indicate such call, and at the same instant the induced current passing through the secondary coils $g$ will neutralize or demagnetize core No. 1 and cause it to release pointer No. 1, which latter would then fall by gravity against the stop. In like manner, when a call is made any pointer that by reason of a previous call is being held against its adjacent core, such pointer will be disengaged from its core whenever a second call is made from any other call-button of the series.

In Fig. 3 is shown a modification where the pointers are suspended midway between two cores, and hence the pointer may be drawn successively against either core, and thus indicate successively two calls. The only object of such construction is to save room and some little expense in having fewer pointers, so that an annunciator having, for instance, several hundred magnets can be reduced to as small compass as possible.

What we claim is—

1. An electrical annunciator comprising a series of differential magnets, the primary coils thereof connecting in common with the battery and connecting, respectively, with the different call-buttons, the secondary coils thereof connecting the one with the other in a continuous closed circuit, and gravity-pointers pivoted to the face-plate of the annunciator in position to be attracted by the core of the next adjacent magnet, substantially as set forth.

2. An electrical annunciator comprising a series of differential magnets, the primary coils thereof connecting with the battery and connecting, respectively, with the different call-buttons, the secondary coils of these magnets connecting with each other in a continuous closed circuit, and gravity-pointers pivoted to the face-plate and depending between adjacent cores of the differential magnets in position to be attracted by either opposing core, substantially as set forth.

In testimony whereof we sign this specification, in the presence of two witnesses, this 14th day of December, 1889.

JOHN W. LUTHE.
ALFRED E. JEAVONS.

Witnesses:
CHAS. H. DORER,
WILL B. SAGE.